US011781601B2

(12) United States Patent
Hasl et al.

(10) Patent No.: US 11,781,601 B2
(45) Date of Patent: Oct. 10, 2023

(54) MULTI-PLATE CLUTCH TRANSMISSION AND MARINE VEHICLE INCLUDING A MULTI-PLATE CLUTCH TRANSMISSION

(71) Applicants: AB VOLVO PENTA, Gothenburg (SE); Emil Hasl, Norfolk, VA (US); William Gremminger, Virginia Beach, VA (US); Justin Frohock, Virginia Beach, VA (US)

(72) Inventors: Emil Hasl, Norfolk, VA (US); William Gremminger, Virginia Beach, VA (US); Justin Frohock, Virginia Beach, VA (US)

(73) Assignee: AB VOLVO PENTA, Gothenburg (SE)

( * ) Notice: Subject to any disclaimer, the term of this patent is extended or adjusted under 35 U.S.C. 154(b) by 165 days.

(21) Appl. No.: 17/266,762

(22) PCT Filed: Jun. 11, 2019

(86) PCT No.: PCT/US2019/036543
§ 371 (c)(1),
(2) Date: Feb. 8, 2021

(87) PCT Pub. No.: WO2020/251552
PCT Pub. Date: Dec. 17, 2020

(65) Prior Publication Data
US 2022/0090637 A1 Mar. 24, 2022

(51) Int. Cl.
*F16D 13/52* (2006.01)
*B63H 23/30* (2006.01)
(Continued)

(52) U.S. Cl.
CPC ............ *F16D 13/52* (2013.01); *B63H 23/30* (2013.01); *F16H 3/145* (2013.01);
(Continued)

(58) Field of Classification Search
CPC ......... B63H 23/30; F16H 3/145; F16D 13/52; F16D 2121/14; F16D 2127/02; F16D 2300/10
See application file for complete search history.

(56) References Cited

U.S. PATENT DOCUMENTS 2,091,270 A 8/1937 Colman
3,212,349 A 10/1965 Bergstedt
(Continued)

FOREIGN PATENT DOCUMENTS

AU 22214/70 5/1972
AU 40107/89 2/1991
(Continued)

OTHER PUBLICATIONS

Chinese Official Action (dated May 15, 2023) for corresponding Chinese App. 201980066347.7.
(Continued)

*Primary Examiner* — Bobby Rushing, Jr.
(74) *Attorney, Agent, or Firm* — WRB-IP PLLC (57) ABSTRACT

A multi-plate clutch transmission includes an arrangement for selectively engaging the clutch by moving the sleeve to cause one or more friction disks on a sleeve connected to a shaft to move into contact with one or more friction disks on a clutch basket connected to a gear driven by another gear and another shaft driven by a prime mover. An arrangement for selectively disengaging the clutch is provided that uses prime mover torque to move the one or more friction disks on the sleeve out of contact with the one or more.friction disks on the clutch basket.

20 Claims, 7 Drawing Sheets

(51) Int. Cl.
  *F16D 121/14* (2012.01)
  *F16H 3/14* (2006.01)
  *F16D 127/02* (2012.01)

(52) U.S. Cl.
  CPC ...... *F16D 2121/14* (2013.01); *F16D 2127/02* (2013.01); *F16D 2300/10* (2013.01)

(56) References Cited

U.S. PATENT DOCUMENTS

| | | | |
|---|---|---|---|
| 3,269,497 A | | 8/1966 | Bergstedt |
| 3,383,602 A | | 6/1968 | Ivanchich |
| 3,915,270 A | | 10/1975 | Miller |
| 4,397,198 A | * | 8/1983 | Borgersen ............... B63H 23/02 |
| | | | 74/378 |
| 4,474,072 A | * | 10/1984 | Hallenstvedt .......... B63H 23/08 |
| | | | 192/21 |
| 4,630,719 A | | 12/1986 | McCormick |
| 4,986,403 A | | 1/1991 | Tipton |
| 5,096,034 A | | 3/1992 | Foster |
| 5,709,128 A | * | 1/1998 | Skyman ................. F16H 63/32 |
| | | | 74/323 |
| 5,715,728 A | * | 2/1998 | Hallenstvedt ............. F16H 3/14 |
| | | | 74/417 |
| 6,582,259 B1 | * | 6/2003 | Mansson ................ B63H 20/14 |
| | | | 440/75 |
| 6,960,107 B1 | | 11/2005 | Schaub et al. |
| 2010/0101351 A1 | | 4/2010 | Lafer et al. |
| 2013/0168198 A1 | | 7/2013 | Youngwerth et al. |
| 2018/0079478 A1 | | 3/2018 | Tomoyuki |

FOREIGN PATENT DOCUMENTS

| | | | | |
|---|---|---|---|---|
| CN | 108290627 A | | 7/2018 | |
| DE | 1025927 B | | 3/1958 | |
| EP | 3395670 A1 | | 10/2018 | |
| GB | 516974 A | | 1/1940 | |
| RU | 181227 U1 | * | 7/2018 | ............... B22F 3/16 |
| WO | 2005012078 A1 | | 2/2005 | |

OTHER PUBLICATIONS

European Search Report (dated Dec. 6, 2022) for corresponding European App. 19932386.6.
International Search Report (dated Aug. 20, 2019) for corresponding International App. PCT/US2019/036543.

* cited by examiner

MULTI-PLATE CLUTCH TRANSMISSION AND MARINE VEHICLE INCLUDING A MULTI-PLATE CLUTCH TRANSMISSION

BACKGROUND AND SUMMARY

The present invention relates generally to transmissions and, more particularly, to multi-plate transmissions.

In transmissions for marine vehicles, it is conventional to use dog clutches, cone clutches, and hydraulic plate clutches. A conventional cone clutch for a marine vehicle transmission is shown in U.S. Pat. No. 3,269,497, which is incorporated by reference. The cone clutch operates in three positions. In the neutral position, the cone rotation is stationary while bevel gearing is rotated in mesh via the input shaft to, e.g., a pinion connection. There is a gear above and a gear below the cone clutch and these gears rotate in opposite directions in mesh with the pinion. Each gear has a rigidly attached shift cup facing the cone clutch. As the cone is urged upward by the shift lug shown, it begins to touch the shift cup of the rotating upward gear. Once cup-to-cone contact is made, the resulting frictional forces encourage the cone to rotate in the direction of the adjoining gear. The cone is guided by the output shaft which utilizes a screw thread to pilot and constrain the motion of the cone. Once the friction induced rotation occurs, the screw thread forces the cone upwardly thereby driving it home into the cup of the gear above, thus fully engaging the cup and cone for full torque transmission from the input shaft through the bevel gear through the cup and cone to the output shaft.

When the cone is retracted from the cup by the downward motion of the shift lug, disengagement occurs and the neutral position is achieved. Similarly as the shift lug moves downward, engagement occurs with the lower gear in the same manner and torque transmission occurs in the opposite rotational direction. Careful selection of materials of the cup and cone, as well as specific angles for each, have been highly developed to optimize this type of shift system. The materials required in cone clutch shift systems are necessarily very rigid due to the extremely high axial and radial forces encountered with the cone and cup architecture. Through put torque is transmitted by the frictional forces developed through a normal (non-axial) force between the cone and adjoining cup which is created by the output shaft driving the cone upward or downward by the screw thread on the output shaft.

Due to the use of rigid materials to satisfy the high axial and radial forces inherent in this device, the speed at which engagement occurs, and the associated high accelerations of the gear train inherent with each engagement event of the cone to cup, each engagement is accompanied by an audible "shift clunk." In the cone clutch type transmission, the non-axial normal force is developed by a helical thread between the cone and output shaft. The frictional forces that result from the non-axial normal force between the cone and cup interaction are responsible for transmitted torque.

Another form of transmission used in marine vehicles is a hydraulic transmission designed with multiple plate wet clutch assemblies to accomplish shifting in a quiet and smooth manner. These types of marine transmissions all utilize an oil pump and a control unit. The oil pump is continuously rotated by the input shaft, and two clutch units are usually rigidly affixed on the input shaft and rotated continuously. A hydraulic control block directs oil flow/pressure to one of the respective clutches rotating in a desired output shaft rotation direction.

In one form of such a hydraulic clutch, a common clutch drum is rigidly affixed to the input shaft which also continuously rotates the oil pump. The oil pump is in flow communication with the clutch drum via separate axial drillings in the input shaft. Oil flow/pressure from the oil pump to the clutch drum is controlled via hydraulic control valves. Two beveled gears are constrained with bearings on the input shaft and are allowed to rotate independently as directed by clutch engagement. The gears are connected in mesh with a common output gear to transmit torque out of the transmission.

The multi-plate wet clutch can be closed by oil pressure to either gear (independently) to accomplish forward or reverse functions. When oil flow/pressure is diverted from the clutch drum by the control valve, the clutch(s) open and neutral is accomplished. In neutral, gears on the input shaft and the output shaft are motionless, as the input shaft, clutch drum, and oil pump continue to rotate. In this manner the forward-neutral-reverse functions are accomplished by the hydraulic transmission.

In this type of hydraulic transmission system, the transmitted torque is directly proportional to the oil pressure that is imposed by the oil pump on the clutch system of given hydraulic piston area and clutch disk contact surface area. Further, a control valve system is required to coordinate clutch functionality. The output shaft remains stationary in the neutral position when oil flow/pressure is directed away from the clutch units leaving them in the "open" position. For forward or reverse functions oil flow/pressure is directed by the hydraulic control valve to either the forward or reverse clutch independently. The hydraulic clutches utilize only axial forces which are developed by the application of oil flow/pressure to the clutch unit. The axial force pushes the planar clutch disks together causing frictional forces to couple the gear to the output shaft for the conveyance of torque through the transmission. Torque transmitted is directly proportional to the oil pressure acting upon a hydraulic piston that in turn forces clutch disks of designed contact area to develop friction in order to transmit torque. Design tradeoffs exist between desired transmitted torque and the necessary size of clutch area and the required pressure of the oil pump. As oil pressure is increased, hydraulic losses increase and are unrecoverable. Quiet smooth shifting is accomplished with a wet clutch assembly at the expense of additional complications such as a dedicated oil pump and hydraulic control valve assembly balanced with the required clutch contact area.

DE1025927 relates to a reversing gear for a train in which torque is transmitted from a bevel pinion to one of two face wheels to a first cage attached to a first one of the face wheels on which clutch plates are provided to clutch plates on a sleeve that is mounted on a threaded part of an output shaft, and from the sleeve to the output shaft. To reverse direction of the output shaft, the system must be stopped. The sleeve is then moved so that clutch plates on a second cage attached to the second face wheel to the clutch plates on, the sleeve, and torque is transmitted from the bevel pinion to the second face wheel to the second cage to clutch plates on the sleeve, and from the sleeve to the output shaft.

It is desirable to provide a transmission that avoids the mechanical "clunk" of a cone clutch. It is also desirable to provide a transmission that can be easily shifted into and out of gear while the engine is running. It is also desirable to provide a transmission that can be efficient, mechanically simple, low weight, and compact and that can be produced at minimal cost.

In accordance with an aspect of the present invention, a multi-plate clutch transmission, comprises a first shaft, a first gear mounted on and non-rotatable relative to the first shaft, a second shaft, a second gear coaxially mounted on and rotatable relative to the second shaft, the second gear engaging with the first gear and being arranged to rotate in a first rotational direction when the first shaft rotates in an first shaft rotational direction, a clutch basket fixed to one of the first gear or the second gear and coaxially mounted on and rotatable relative to one of the first shaft or the second shaft, respectively, the one of the first or second shaft comprising an externally threaded portion with external threads, the clutch basket comprising one or more friction disks extending radially inward from an interior surface of the clutch basket, a sleeve comprising internal threads that mate with the externally threaded portion on the one of the first or second shaft and one or more friction disks extending radially outward from an exterior surface of the sleeve, and means for selectively engaging the clutch by moving the sleeve to cause the one or more friction disks on the sleeve to move into contact with the one or more friction disks on the clutch basket, and means for selectively disengaging the clutch using prime mover torque to move the one or more friction disks on the sleeve out of contact with the one or more friction disks on the clutch basket.

In accordance with a further aspect of the invention, the means for selectively engaging the clutch comprises a groove around a circumference of the sleeve, and an actuator arrangement, the actuator arrangement comprising an actuator body that is pivotable about an axis of rotation of the actuator body between a first position and a second position, a shoe extending from the actuator body, a longitudinal axis of the shoe being offset from the axis of rotation of the actuator body, wherein the shoe is received in the groove and, when the actuator body is in the first position, the shoe is disposed substantially in a center of the groove and the one or more friction disks on the sleeve are out of contact with the one or more friction disks on the clutch basket and, when the actuator body is moved to the second position, the shoe contacts a surface of the groove and moves the sleeve so that the one or more friction disks on the sleeve are moved into contact with the one or more friction disks on the clutch basket.

In accordance with a further aspect of the present invention, the selective disengaging means comprises a groove around a circumference of the sleeve, a longitudinal central axis of the groove being offset from a longitudinal central axis of the sleeve.

In accordance with a further aspect of the present invention, the selective disengaging means further comprises an actuator arrangement, the actuator arrangement comprising an actuator body that is pivotable about an axis of rotation of the actuator body between a first position and a second position, a shoe slidably mounted in and partially extending from a hole in the actuator body, a shoe portion of the shoe being disposed outside of the hole, the hole being offset from the axis of rotation of the actuator body, and a resilient member for urging the shoe away from the hole, wherein the shoe portion is received in the groove and, when the actuator body is in the second position, the shoe portion contacts a surface of the groove and the one or more friction disks on the sleeve are in contact with the one or more friction disks on the clutch basket, and, when the actuator body is urged to move to the first position, the shoe portion contacts an opposite surface of the groove and is urged into the hole and bottoms out relative to the actuator and, as the prime mover causes rotation of the sleeve to continue, contact between the groove and the shoe moves the one or more friction disks on the sleeve out of contact with the one or more friction disks on the clutch basket.

In accordance with yet another aspect of the present invention, a multi-plate clutch transmission comprises a first shaft, a first gear mounted on and non-rotatable relative to the first shaft, a second shaft, a second gear coaxially mounted on and rotatable relative to the second shaft, the second gear engaging with the first gear and being arranged to rotate in a first rotational direction when the first shaft rotates in an first shaft rotational direction, a clutch basket fixed to one of the first gear or the second gear and coaxially mounted on and rotatable relative to one of the first shaft or the second shaft, respectively, the one of the first or second shaft comprising an externally threaded portion with external threads, the clutch basket comprising one or more friction disks extending radially inward from an interior surface of the clutch basket, a sleeve comprising internal threads that mate with the externally threaded portion on the one of the first or second shaft and one or more friction disks extending radially outward from an exterior surface of the sleeve, and means for moving the sleeve to selectively cause the one or more friction disks on the sleeve to move into and out of contact with the one or more friction disks on the clutch basket, wherein a lead angle of the internal and external threads is selected as a function of pressure capacity of material of friction disks on the sleeve and the clutch basket and one or more of a number of friction disks on the sleeve and the clutch basket, inner and outer diameters of friction disks on the sleeve and the clutch basket, a coefficient of friction between material on friction disks on the sleeve and material on friction disks on the clutch basket, prime mover torque be transmitted, a gear ratio between the first gear and the second gear, and a relationship between clutch capacity and idle torque.

In accordance with still another aspect of the present invention, a method of providing a multi-plate clutch transmission is provided, the multi-plate clutch transmission comprising a first shaft, a first gear mounted on and non-rotatable relative to the first shaft, a second shaft, a second gear coaxially mounted on and rotatable relative to the second shaft, the second gear engaging with the first gear and being arranged to rotate in a first rotational direction when the first shaft rotates in an first shaft rotational direction, a clutch basket fixed to one of the first gear or the second gear and coaxially mounted on and rotatable relative to one of the first shaft or the second shaft, respectively, the one of the first or second shaft comprising an externally threaded portion with external threads, the clutch basket comprising one or more friction disks extending radially inward from an interior surface of the clutch basket, a sleeve comprising internal threads that mate with the externally threaded portion on the one of the first or second shaft and one or more friction disks extending radially outward from an exterior surface of the sleeve, and means for moving the sleeve to selectively cause the one or more friction disks on the sleeve to move into and out of contact with the one or more friction disks on the clutch basket. The method comprises selecting a lead angle of the internal and external threads as a function of pressure capacity of material of friction disks on the sleeve and the clutch basket and one or more of a number of friction disks on the sleeve and the clutch basket, inner and outer diameters of friction disks on the sleeve and the clutch basket,
a coefficient of friction between material on friction disks on the sleeve and material on friction disks on the clutch basket,
prime mover torque to be transmitted,
a gear ratio between the first gear and the second gear, and
a relationship between clutch capacity and idle torque.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
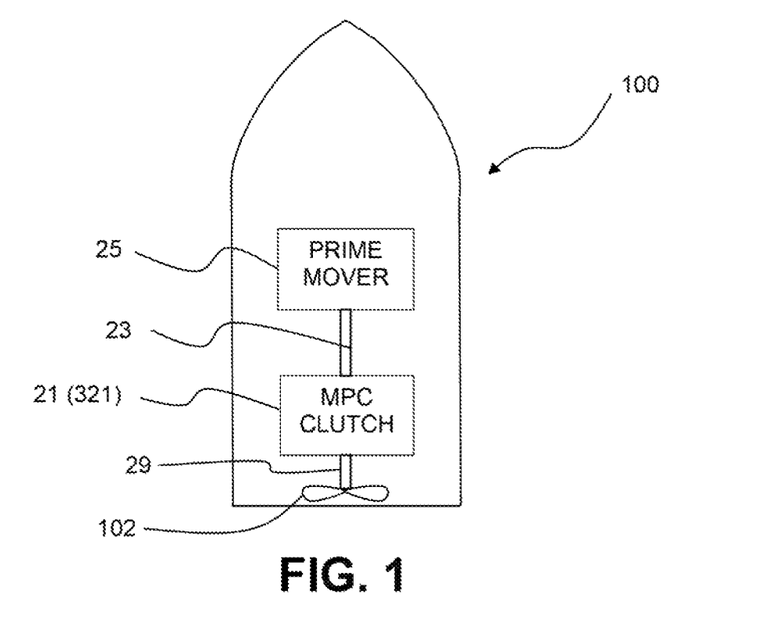
FIG. 1 is a schematic view oft marine vehicle including a multi-plate clutch transmission according to an aspect of the present invention.
Figure 2:
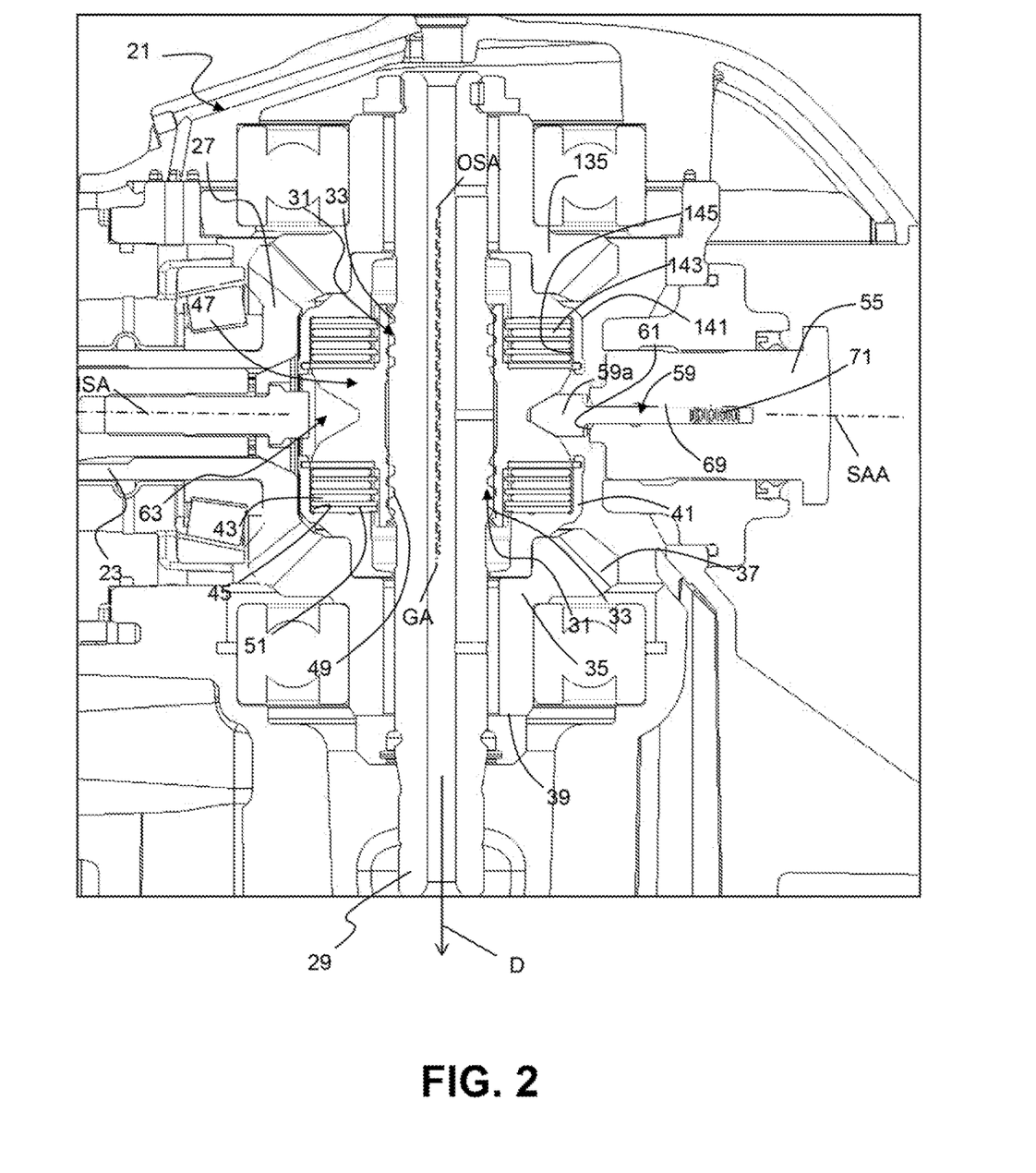
FIG. 2 is a cross-sectional view of a multi-plate clutch transmission according to an aspect of the present invention showing the multi-plate clutch transmission in neutral.

FIG. 1 is a schematic view of a marine vehicle 100 including a multi-plate clutch (MPC) transmission 21 according to an aspect of the present invention. FIG. 2 shows an embodiment of an MPC transmission 21 according to an aspect of the present invention. The MPC transmission 21 includes an input shaft 23 connectable to a prime mover 25 such as an engine or an electric motor. An input gear 27 is mounted on and non-rotatable relative to the input shaft 23.

The MPC transmission 21 further comprises an output shaft 29, the output shaft comprising an externally threaded portion 31 with external threads 33. An output gear 35 is coaxially mounted on and rotatable relative to the output shaft 29. The output gear 35 engages with the input gear 27 and is arranged to rotate in a first rotational direction when the input shaft rotates in an input shaft rotational direction. For example, when the input gear 27 rotates in a clockwise direction (when viewed along a longitudinal axis ISA of the input shaft 23 from the input gear toward the prime mover 25), the output gear 35 rotates in a counter-clockwise direction (when viewed in a direction D along a longitudinal axis OSA of the output shaft 29 from a first end 37 of the output gear toward a second axial end 39 of the output gear).

The input gear 27 and the output gear 35 (and gear 135) can be bevel gears or other suitable types of gears. The input gear 27 and the output gear 35 (and gear 135) can both be (but need not be) bevel gears, which is useful when it is desirable or necessary to output torque along a different axis than the axis along which torque is input. In FIG. 2, for example, the input shaft 23 is substantially perpendicular to the output shaft 29.

An output clutch basket 41 is fixed to the output gear 35 in a suitable manner, such as by being welded to or formed integrally with the output gear, and coaxially mounted on and rotatable relative to the output shaft 29. The output clutch basket 41 comprises one or more friction disks 43 extending radially inward from an interior surface 45 of the output clutch basket. The friction disks 43 can be connected to the interior surface 45 of the output clutch basket 41 via spline connections or any other suitable arrangement.

A sleeve 47 is provided around the output shaft 29 and comprises internal threads 49 that mate with the external threads 33 on the externally threaded portion 31 on the output shaft. The sleeve 47 also comprises one or more friction disks 51 extending radially outward from an exterior surface of the sleeve. The sleeve 47 can be made as a single piece, or in multiple pieces that are attached to each other. The friction disks 51 can be attached to the exterior surface of the sleeve via spline connections or any other suitable arrangement.

Means is provided for selectively engaging the clutch by moving the sleeve 47 to cause the one or more friction disks 51 on the sleeve to move into contact with the one or more friction disks 43 on the output clutch basket 41. The friction disks 51 and 43 will ordinarily be made of steel and may have a different, non-steel friction material attached to one or both sides of the disks. A presently preferred selective engaging means can comprise a shift actuator body 55 that is rotatable or pivotable about a longitudinal axis SAA, such as by moving a lever 57 (seen in FIGS. 3-5) back and forth between at least a first position (FIG. 2) in which the MPC transmission is in "neutral" and a second position (FIG. 3) in which the MPC transmission is in what shall be designated "forward" for purposes of the present description. The selective engaging means can also include a shoe or lug 59 that is disposed on an end 61 of the shift actuator body 55 and is off-center relative to the shift actuator axis SAA so that, as the shift actuator body pivots about the shift actuator axis, the shoe will be moved relative to the longitudinal axis OSA of the output shaft 29 (up or down in FIG. 2). The shoe 59 is received in a groove 63 in an exterior surface 65 (FIG. 6) of the sleeve 47 so that, when the shift actuator body 55 is pivoted about its longitudinal axis SAA and the shoe is moved down (to the position shown in FIG. 3), the one or more friction disks 51 on the sleeve move into contact with the one or more friction disks 43 on the output clutch basket 41.

Figure 3:
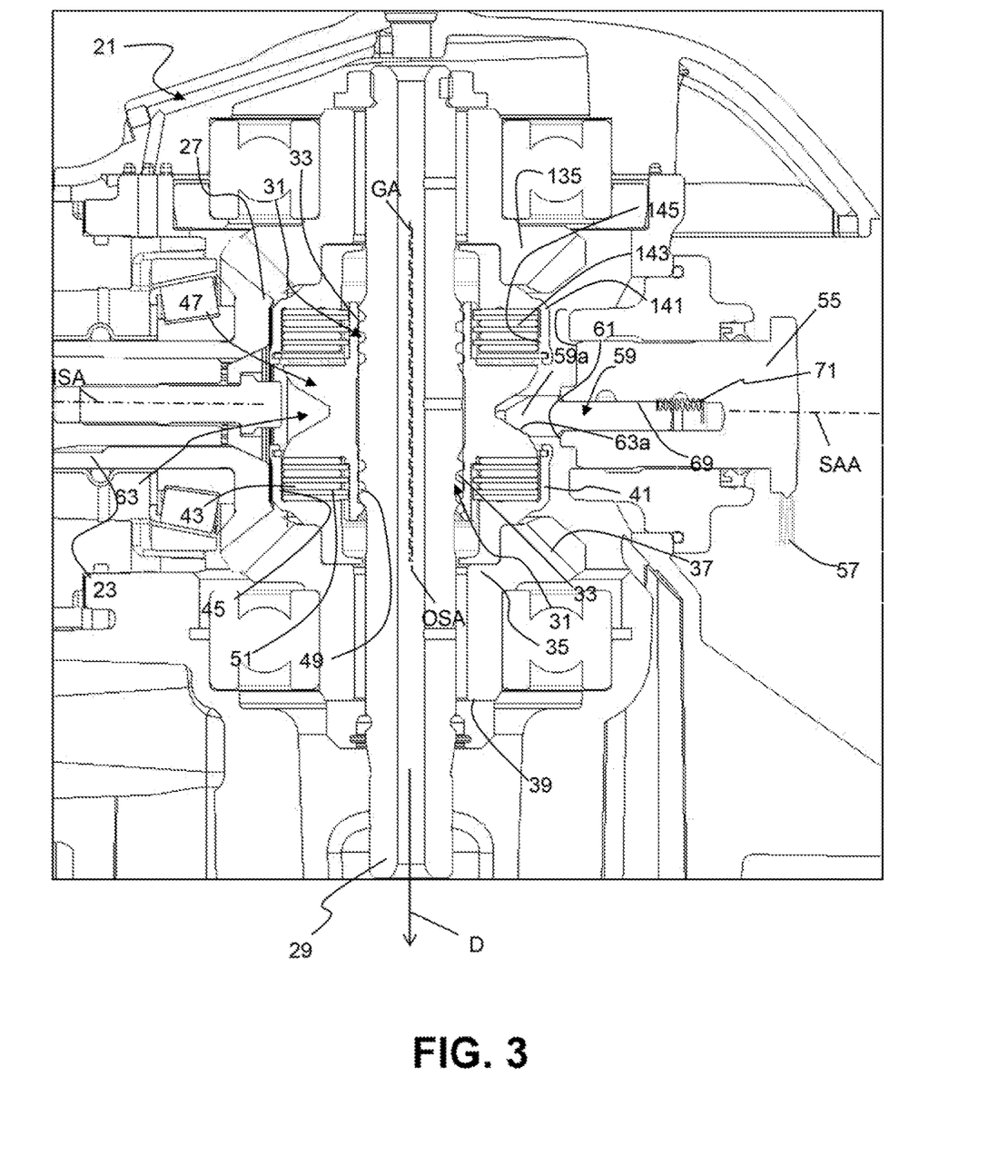
FIG. 3 is a cross-sectional view of the multi-plate clutch transmission of FIG. 2 showing the multi-plate clutch transmission in a forward gear.

When the clutch is engaged as is seen in FIG. 3, i.e. the one or more friction disks 51 on the sleeve 47 contact the one or more friction disks 43 on the output clutch basket 41, and the prime mover 25 is running, torque transmitted from the prime mover to the input shaft 23 is transmitted from the input shaft, to the input gear 27, to the output gear 35, through the friction disks 51 and 43, to the sleeve 47, to the output shaft 29. Resistance to turning of the output shaft 29, such as is applied by water against a propeller 102 (FIG. 1) attached to the output shaft, causes the sleeve 47 to be screwed downwardly along the external threads 33 on the output shaft and, in addition to keeping the friction disks 51 on the sleeve 47 in contact the one or more friction disks 43 on the output clutch basket 41, prevents the friction disks on the sleeve from moving out of contact with the friction disks on the output clutch basket.

To assist in overcoming the force tending to keep the friction disks 51 on the sleeve 47 in contact the one or more friction disks 43 on the output clutch basket 41, means is also provided for selectively disengaging the clutch using prime mover torque to move the friction disks on the sleeve out of contact with the friction disks on the output clutch basket. In a presently preferred embodiment of the selective disengaging means the groove 63 comprises a V-shaped groove around a circumference of the sleeve 47, a longitudinal central axis GA of the groove being offset from a longitudinal central axis SA of the sleeve (which is usually coaxial with the longitudinal axis OSA of the output shaft 29). It will be appreciated that the groove 63 need not necessarily be V-shaped and may, for example, be more U-shaped with walls that approach perpendicular to the axis of the sleeve 47, however, it is presently believed that a V-shape will facilitate disengagement by facilitating sliding of the actuator shoe relative to the groove.

The selective disengaging means also comprises the actuator arrangement that comprises the shift actuator body 55 that is pivotable about an axis of rotation SAA of the actuator body between at least the first position and the second position. The shoe 59 can be slidably mounted in and partially extend from a hole 69 in the actuator body, a shoe portion 59a of the shoe being disposed outside of the hole. The hole 69 is offset from the axis of rotation SAA of the actuator body 55. A resilient member 71 such as a spring, is provided in the hole 69 for urging the shoe 59 away from the hole. The shoe portion 59a is received in the groove 63 and, when the actuator body is in the second position (FIG. 3), the shoe portion contacts a surface 63a (FIGS. 3 and 6) of the groove on the side of the groove to which the sleeve has been moved and the one or more friction disks 51 on the sleeve 47 are in contact with the one or more friction disks 43 on the output clutch basket 41.

Figure 4:
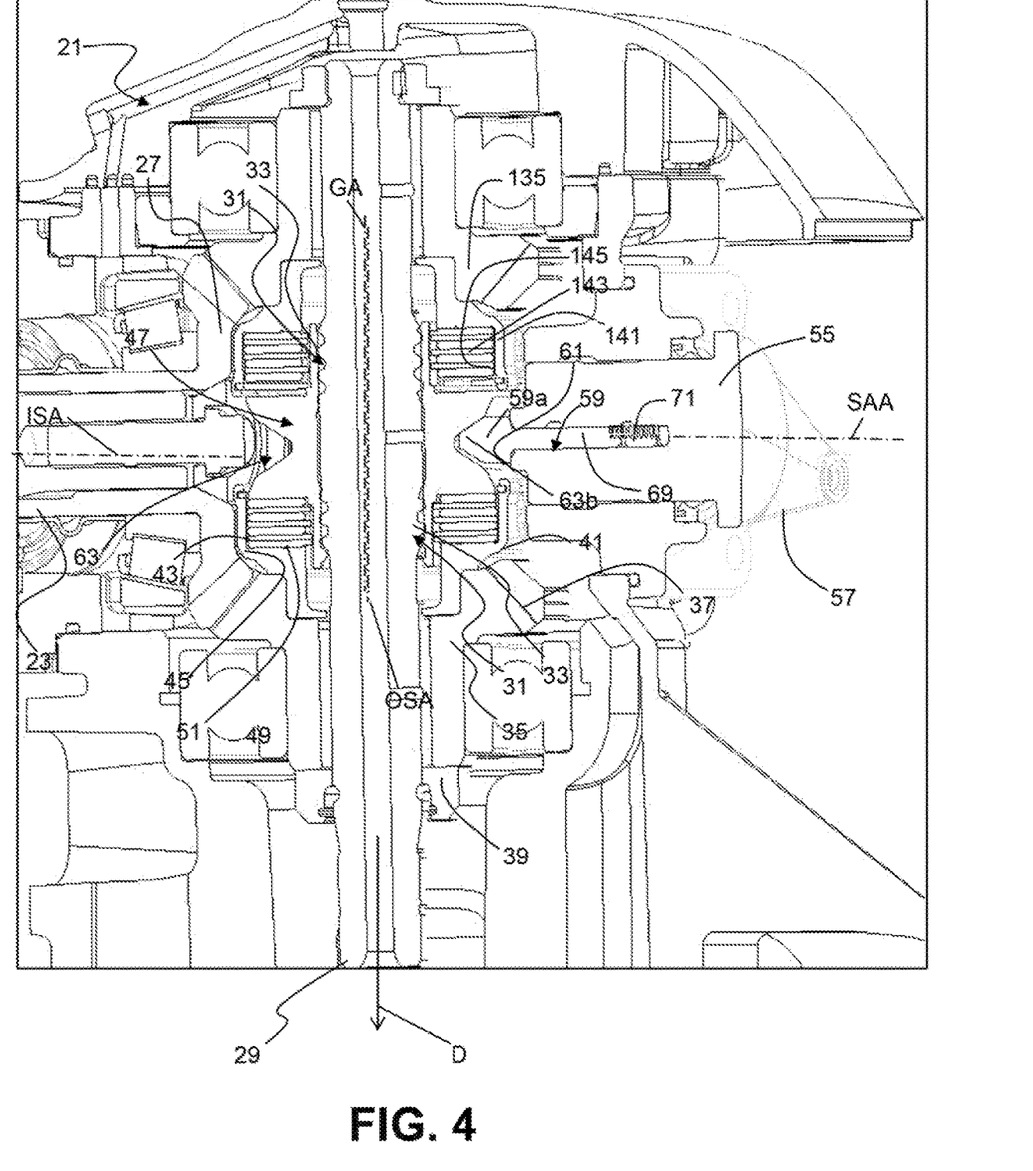
FIG. 4 is a cross-sectional view of the multi-plate clutch transmission of FIG. 2 showing the multi-plate clutch transmission moving from a forward gear to a neutral gear.

When, as seen in FIG. 4, the actuator body 55 is urged to move from the second position (FIG. 3) back to the first position, the shoe portion 59a contacts an opposite surface 63b (FIGS. 4-6) of the groove 63 and, ordinarily due to the angle of the groove (and, usually, the angle of the shoe portion), the shoe portion slides up the opposite surface 63b of the groove and the shoe is urged into the hole 69 and eventually bottoms out relative to the actuator body, usually either by the shoe bottoming out in the hole, or the shoe portion bottoming out against a surface 55a of the actuator body. Meanwhile, the prime mover 25 causes rotation of the sleeve 47 to continue. Contact between the groove 63 and the shoe portion 59a moves the one or more friction disks 51 on the sleeve 47 out of contact with the one or more friction disks 43 on the output clutch basket 41.

To further explain, when the shift actuator body 55 is urged toward the neutral position as seen in FIG. 4, the shoe 59 moves (upwardly in FIG. 4) into contact with the opposite face 63b of the (ordinarily V-shaped) groove 63 and the shoe portion 59a slides up the surface of the groove against the force of the resilient member 71 toward the shift actuator body 55 until it bottoms out relative to the actuator body. When the sleeve 47 spins, the offset groove 63 pushes toward the right in FIG. 4 which, correspondingly, tries to push the shoe 59 toward the right, i.e. toward the actuator body 55. The amount of offset between GA and SA can be relatively small, with a presently preferred offset being about 0.5 mm, however, this amount of offset means that the surface of the groove 63 moves in and out about 1 mm in a direction perpendicular to a longitudinal axis of the sleeve 47 about 1 mm each time the sleeve spins around its longitudinal axis. Because the shoe 59 is bottomed out relative to the actuator body 55 in this position, it is unable to move any further to the right. Under these circumstances, the only way for the system to resolve is for the sleeve 47 to move upward, pulling the MPC transmission out of forward gear into neutral gear (FIG. 2) in which that the friction disks 51 on the sleeve 47 are moved out of contact with the friction disks 43 on the output clutch basket 41, i.e. using prime mover torque.

U.S. Pat. Nos. 3,269,497, 3,915,270, 4,630,719, and 5,096,034 describe illustrative means for selectively disengaging a cone clutch using prime mover torque that are suitable for use as the means for selectively disengaging the multi-plate clutch according to the present invention using prime mover torque, and both are incorporated by reference herein.

Figure 5:
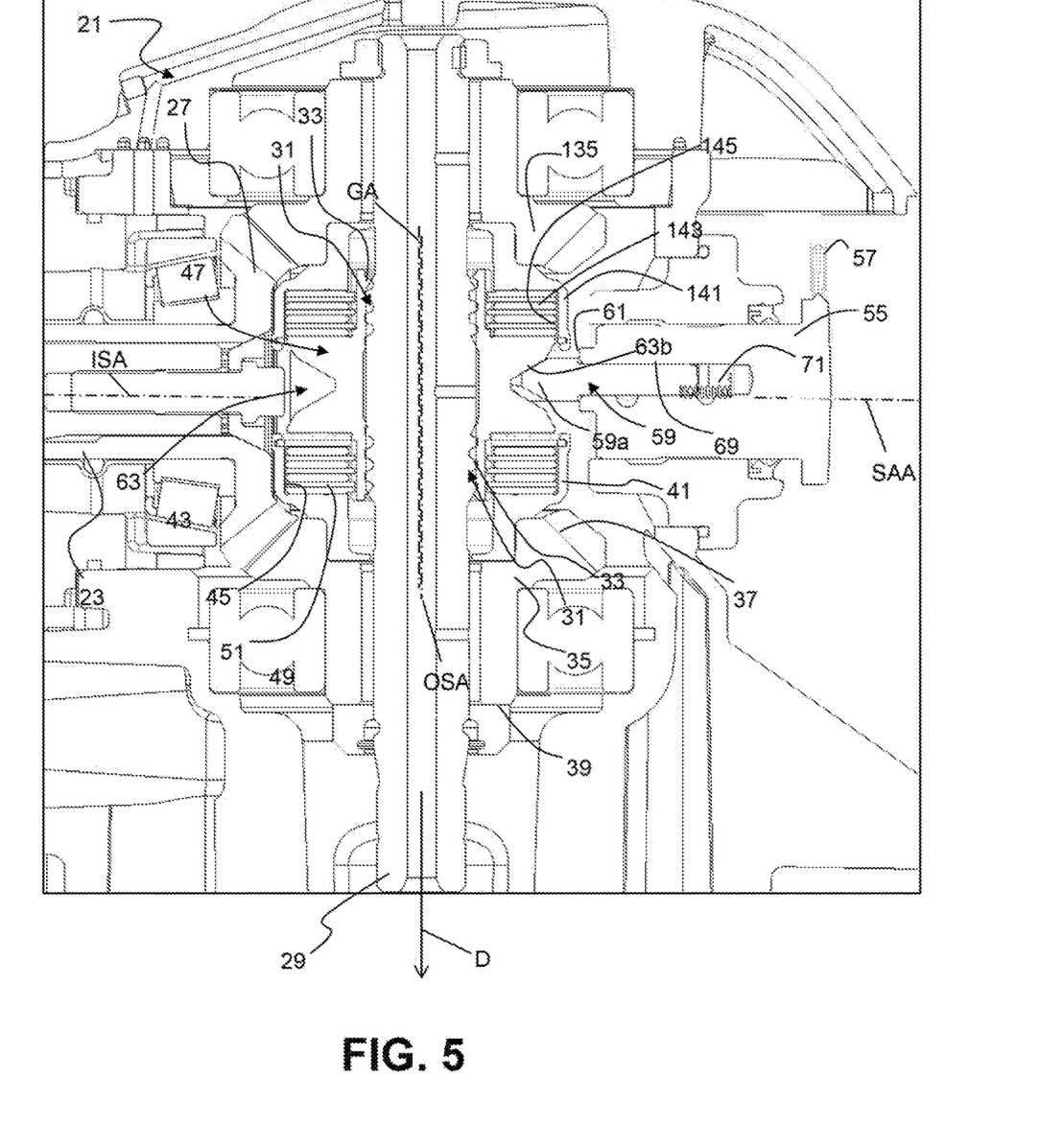
FIG. 5 is a cross-sectional view of the multi-plate clutch transmission of FIG. 2 showing the multi-plate clutch transmission in a reverse gear.
Figure 6:
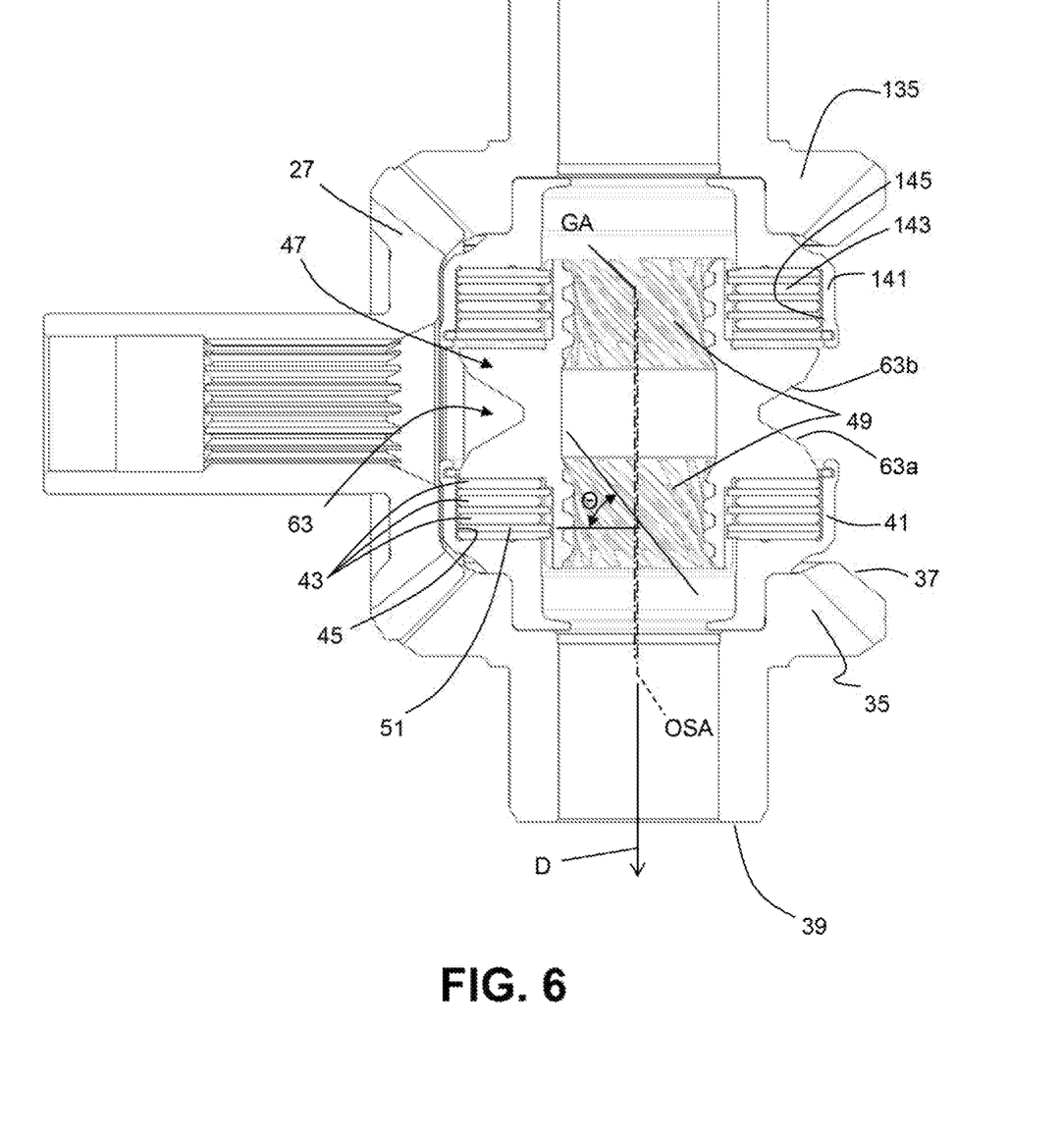
FIG. 6 is a cross-sectional view of a portion of a multi-plate clutch transmission according to an aspect of the present invention showing internal threads on a sleeve of the multi-plate clutch transmission.

The MPC transmission 21 will ordinarily also be provided with structure for rotating the output shaft 29 in the direction opposite the "forward" direction of FIG. 3, i.e. in what shall be designated for purposes of the present description as "reverse", as shown in FIG. 5. The structure for rotating the output shaft 29 in reverse is similar to the structure for rotating the output shaft in the forward direction and comprises a second output gear 135 coaxially mounted on and rotatable relative to the output shaft 29, the second output gear engaging with the input gear 27 and being arranged to rotate in a second rotational direction when the input shaft rotates in an input shaft rotational direction. For example, when the input gear 27 rotates in a clockwise direction (when viewed along a longitudinal axis ISA of the input shaft 23 from the input gear toward the prime mover 25), the second output gear 135 rotates in a clockwise direction (when viewed along a longitudinal axis OSA of the output shaft 29 in the direction D). The first rotational direction (for "forward") and the second rotational direction (for "reverse") are ordinarily opposite to each other.

A second output clutch basket 141 is fixed to the second output gear 135 and is coaxially mounted on and rotatable relative to the output shaft 29. The second output clutch basket 141 comprises one or more friction disks 143 extending radially inward from an interior surface 145 of the output clutch basket. When the friction disks 143 of the second output clutch basket 141 contact the friction disks 51 on the sleeve 47, torque is transmitted from the sleeve to the output shaft 29 so that the output shaft rotates in "reverse". The torque transmission is thus from the prime mover 25 to the input shaft 23 to the input gear 27 to the second output gear 135 to the output clutch basket 143 and the friction disks 151 on the output clinch basket to the friction disks 51 on the sleeve and the sleeve 47, and then to the output shaft 29.

Because less torque is typically transmitted in "reverse" than in "forward", it may be possible to use fewer friction plates in the clutch basket and sleeve portion used to transmit torque in reverse than in the clutch basket and sleeve portion used to transmit torque in forward gear.

In substantially the same manner as described in connection with shifting between "neutral" and "forward" and back to "neutral", the selective engaging means for selectively engaging the clutch is adapted to move the sleeve 47 (up in FIG. 2) to cause the one or more friction disks 51 on the sleeve 47 to move into contact with the one or more friction disks 143 on the second output clutch basket 141 (i.e., from "neutral" to "reverse"), and the means for selectively disengaging the clutch using prime mover torque is configured to move the one or more friction disks on the sleeve out of contact with the one or more friction disks on the second output clutch basket (i.e. from "reverse" to "neutral").

In a typical marine transmission application, the MPC transmission will be arranged as shown in FIGS. 2-5, with the output gear 35 disposed below the output gear 135. The input gear 27 and the output gears 35 and 135 will ordinarily be disposed in a case (not shown). The output gear 35 will typically be submerged in lubricating oil in the case, while the output gear 135 will typically be disposed above the liquid level of the lubricating oil, but will be lubricated by spray from rotating components in the case.

It will be observed that, in the "neutral" position (FIG. 2) the friction disks 51 on the sleeve 47 float freely as the gears rotate the driven disks 43 and 143 in opposite directions. For forward gear, the sleeve 47 is moved downwardly to the position as seen in FIG. 3 by the selective engaging means until the friction disks' 51 proximity to the friction disks 43 is reduced to induce hydrodynamic drag force. This drag force, and resistance to turning of the output shaft 29 from water acting against the propeller 102, in turn induces the output shaft's 29 screw thread 33 to drive the sleeve 47 downward causing an axial force utilized to clamp the friction disks 51 to the driven friction disks 43 for the transmission of torque through the transmission. Disengagement is accomplished by the upward motion of the sleeve 47. "Reverse" is accomplished the sleeve 47 being moved upwardly to the position seen in FIG. 5 by the selective engaging means until the friction disks' 51 proximity to the friction disks 143 is reduced to induce hydrodynamic drag force. This drag force in turn induces the output shaft's 29 screw thread 33 to drive the sleeve 47 upward causing an axial force utilized to clamp the friction disks 51 to the driven friction disks 143 for the transmission of torque through the transmission.

Figure 7:
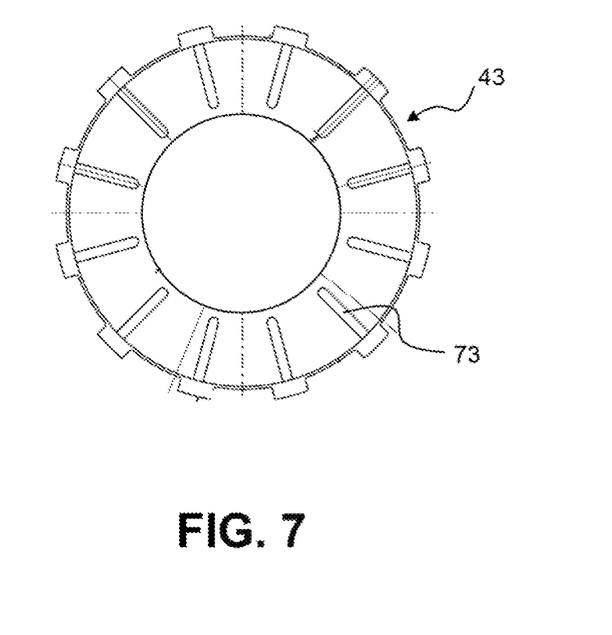
FIG. 7 is a top view of a friction disk for an output clutch basket according to an aspect of the present invention.

Ordinarily, only axial forces are utilized to engage the friction disks 51 and 43 or 143. Further, the disks are preferably not hard rigid surfaces so the shift event need not be characterized by, e.g., harsh contact of a cone and clutch. Additionally, an oil film is maintained between the friction disks 51 and the driven friction disks 43 and 143 and a controlled rate of acceleration of the gear train system is achieved. The friction disks 43 and 143 on the output clutch basket 141 can comprise a plurality of grooves 73 extending to an outside diameter of the disks as seen in FIG. 7 to facilitate removal of oil between the friction disks on the output clutch basket and the friction disks 41 on the sleeve 47. The structure and composition of the clutch disks and the oil film characteristics work together to accomplish a controlled acceleration of the gear train for a silent shift event.

In the present invention, movement of the sleeve 47 longitudinally along the output shaft 29 is ordinarily primarily or, preferably, exclusively limited by contact between the friction disks 51 on the sleeve and the friction disks 43 or 143 on the first or second output clutch baskets 41 or 141, which permits the MPC transmission 21 to involve a minimal number of components. Axial forces are utilized to engage the friction disks 51 and 43 and 143.

When the MPC transmission 21 is in gear, the output shaft 29 is loaded by resistance to turning a propeller (FIG. 1, 102) on the output shaft from water and therefore the output shaft screw thread applies a clamp load on the friction disks 51 and 43 and 143. The design and thread lead of the shaft lead screw thread must be chosen in such a way that that several different functions are not adversely affected:
1. Torque capacity: The clamp load needs to be high enough to carry the torque of the engine at full load;
2. Torque capacity: The clamp load needs to be high enough to carry the torque at low load (idle speed in gear);
3. Clutch plate friction material durability: The clamp load cannot be so high that the friction material of the clutch plates is damaged; and
4. Disengagement force: The clamp load needs to be low when disengaging the clutch.

In general, the larger the lead angle on the output shaft 29 and the sleeve 47, the less force is applied on the friction disks, making the assembly less efficient at transmitting torque. Also, the larger the lead angle on the output shaft 29 and the sleeve, the easier it is to move between gears.

Accordingly, preferably, the lead angle $\Theta$ of the internal threads 49 (FIG. 6) on the sleeve 47 and the external threads 33 on the output shaft 29 is selected as a function of pressure capacity of material of friction disks 51 and 43 and 143 on the sleeve 47 and the output clutch baskets 41 and 141 and one or more of a number of friction disks on the sleeve and the output clutch basket. The larger the lead angle, the less force is applied on the friction disks and, therefore, more plates may be needed to transmit the desired torque if the lead angle is increased.

inner and outer diameters of friction disks on the sleeve and the output clutch basket. The larger the lead angle, the less force is applied on the friction disks and, therefore, larger diameter plates may be needed to transmit the desired torque if the lead angle is increased.

a coefficient of friction between material on friction disks on the sleeve and material on friction disks on the output clutch basket. The larger the lead angle, the less force is applied on the friction disks and, therefore, a higher coefficient of friction between the plates may be needed to transmit the desired torque if the lead angle is increased.

prime mover torque to be transmitted. A larger lead angle applies less force on the friction disks, so a smaller angle is needed to transmit more torque.

a gear ratio between the input gear and the output gear. The larger the lead angle, the less force is applied on the friction disks. At higher gear reductions, a higher torque capacity is needed.

a relationship between clutch torque transmitting capacity and idle torque. The larger the lead angle, the less force is applied on the friction disks so the clutch has less torque transmitting capacity but is easier to shift out of gear. The smaller the lead angle, the more force is applied on the friction disks so the clutch has more torque transmitting capacity but is harder to shift out of gear.

The lead angle $\Theta$ of the internal and external threads is preferably between 1 and 90 degrees, more preferably between 15 and 70 degrees, and still more preferably between 30 and 50 degrees.

A pressure capacity of the material of the friction disks 51 and 43 and 143 on the sleeve 47 and the output clutch baskets 41 and 141 is preferably at least 5 MPa, more preferably at least 10 MPa, and still more preferably at least 20 MPa.

The friction disks 41 and 43 and 143 on the sleeve 47 and each output clutch basket 41 and 141 preferably each include between 1 and 25 friction surfaces, where friction surfaces are defined here as surfaces that are intended to be used to transmit torque and that may, but need not necessarily, be a specially adapted material attached to e.g., a steel disk, more preferably between 5 and 15 surfaces, and still more preferably between 6 and 8 surfaces. It will be appreciated that not all friction disks necessarily have friction surfaces on each side.

The coefficient of friction between material on friction disks on the sleeve and material on friction disks on the output clutch basket is preferably between 0.05 and 0.2, more preferably between 0.075 and 0.175, and, still more preferably between 0.1 and 0.15.

The gear ratio between the input gear and the output gear is preferably between 1:1 and 3:1, more preferably between 1:1 and 2:1, and still more preferably between 1:1 and 1.3:1.

The MPC transmission is an over running, i.e. one directional, clutch in the sense that the clutch only connects in the direction of the prime mover to the driven member, e.g., the propeller, not in the other direction. Reducing the prime mover rpm is independent of propeller rpm, while increasing prime mover rpm is dependent on the propeller rpm, as that is the main function of the clutch.

Via the MPC transmission according to the present invention, axial forces are utilized in the engagement of the clutch system to press the friction surfaces of the friction disks together, which can facilitate a smooth, gradual engagement of the gears, avoiding the "clunk" typically associated with certain types of transmissions that engage quickly.

The MPC transmission according to the present invention does not require an oil pump to generate pressures/forces for clutch operation, thus permitting the MPC transmission to be provided at relatively low cost.

Actuation forces to close the MPC transmission according to the present invention are generated by a helical thread on the output shaft engaged with the clutch actuator. This enables the clutch to carry engine torque without applying external axial force on the friction disks. The axial force is generated from the threaded connection.

The MPC transmission according to the present invention is within the gear mesh geometry of a convention bevel gearing system, i.e. the clutch can fit inside of an existing gear set and can be compact.

In the MPC transmission according to the present invention, forward and reverse clutch disk diameters can be less than the pitch diameter of the bevel gear system and can rotate continuously in opposite directions, facilitating production of an MPC transmission of small size.

In the MPC transmission according to the present invention, the clutch baskets can be affixed to bevel gears and face the center of gear mesh, facilitating production of a compact MPC transmission with few parts that is simple to manufacture and durable.

In the MPC transmission according to the present invention, a single clutch/shift actuator need not be fixed to the output shaft but, instead, is constrained to move axially with a helical screw thread. In a hydraulic clutch, the hydraulic pistons ordinarily spin with the shaft.

In the MPC transmission according to the present invention, a single, self-actuating sleeve moves axially on a single, central helix to accomplish F-N-R shift functions in opposing directions, facilitating production of an MPC transmission with minimal parts.

In the MPC transmission according to the present invention, a single sleeve is engaged simultaneously to both forward and reverse clutch disks with a linear spline where the clutch disks are equally spaced above and below the sleeve's center.

In the MPC transmission according to the present invention, the system can operate between vertically disposed clutches with each clutch basket rigidly attached to the facing side of bevel gearing where a single shift actuator (sleeve) can move vertically on a helix that creates engagement forces due to induced drag from the adjoining clutch disk surfaces.

In the MPC transmission according to the present invention, the sleeve is constrained with a helical screw thread at the extreme ends of the sleeve for concentric stability, where each thread can pilot the sleeve in close proximity to the clutch disks location for concentricity of the friction disks (constrained by the bevel gear face), providing for a simple construction.

In an aspect of the MPC transmission shown in FIGS. 2-5 according to the present invention, the input shaft is not connected to or constraining forward or reverse clutch systems.

The MPC transmission 21 shown in, e.g., FIGS. 2-5 includes the input gear 27 non-rotatably mounted on the input shaft 23. The input gear 27 meshes with two output gears 35 and 135 rotatably mounted on the output shaft 29. Output clutch baskets 41 and 141 with friction disks 43 and 143 are fixed to the output gears 35 and 135, respectively. The sleeve 47 provided with friction disks 51 and having internal threads 49 is mounted on an externally threaded portion 31 of the output shaft 29 and is moved along the output shaft by a shift actuator.

Figure 8:
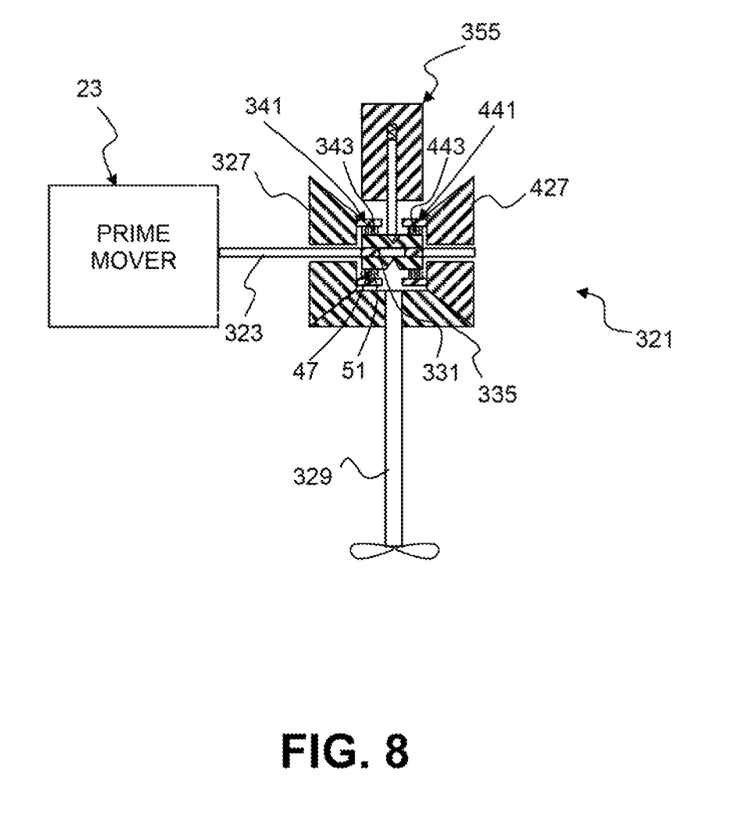
FIG. 8 is a schematic, partially cross-sectional view of a multi-plate transmission according to another aspect of the present invention.

It will be appreciated that the MPC transmission according to the present invention can, alternatively, be arranged as shown in FIG. 8. In the MPC transmission 321 of FIG. 8, the output gear 335 is non-rotatably mounted on the output shaft 329. The output gear 335 meshes with two input gears 327 and 427 rotatably mounted on the input shaft 323. Input clutch baskets 341 and 441 with friction disks 343 and 443 are fixed to the input gears 327 and 327, respectively. The sleeve 47 provided with friction disks 51 and having internal threads (not seen in FIG. 8) is mounted on an externally threaded portion 331 of the input shaft 323 and is moved along the output shaft by a shift actuator 355 to engage and disengage the clutch in the same manner as describe above with respect to the MPC transmission 21 shown in FIGS. 2-5. The MPC transmission 321 can be substituted for the MPC transmission 21 shown in FIGS. 2-5 in the marine vehicle 100 shown in FIG. 1.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A multi-plate clutch transmission, comprising:
a first shaft;
a first gear mounted on and non-rotatable relative to the first shaft;
a second shaft;
a second gear coaxially mounted on and rotatable relative to the second shaft, the second gear engaging with the first gear and being arranged to rotate in a first rotational direction when the first shaft rotates in a first shaft rotational direction;

a clutch basket fixed to one of the first gear or the second gear and coaxially mounted on and rotatable relative to one of the first shaft or the second shaft, respectively, the one of the first or second shaft comprising an externally threaded portion with external threads, the clutch basket comprising one or more friction disks extending radially inward from an interior surface of the clutch basket;

a sleeve comprising internal threads that mate with the externally threaded portion on the one of the first or second shaft and one or more friction disks extending radially outward from an exterior surface of the sleeve; and means for selectively engaging the clutch by moving the sleeve to cause the one or more friction disks on the sleeve to move into contact with the one or more friction disks on the clutch basket, and means for selectively disengaging the clutch using prime mover torque to move the one or more friction disks on the sleeve out of contact with the one or more friction disks on the clutch basket.

2. The multi-plate clutch transmission as set forth in claim 1, wherein the first shaft is connectable to a prime mover.

3. The multi-plate clutch transmission as set forth in claim 1, wherein the means for selectively engaging the clutch comprises:

a groove around a circumference of the sleeve;

an actuator arrangement, the actuator arrangement comprising an actuator body that is pivotable about an axis of rotation of the actuator body between a first position and a second position, a shoe extending from the actuator body, a longitudinal axis of the shoe being offset from the axis of rotation of the actuator body, wherein the shoe is received in the groove and when the actuator body is in the first position, the shoe is disposed substantially in a center of the groove and the one or more friction disks on the sleeve are out of contact with the one or more friction disks on the clutch basket and, when the actuator body is moved to the second position, the shoe contacts a surface of the groove and moves the sleeve so that the one or more friction disks on the sleeve are moved into contact with the one or more friction disks on the clutch basket.

4. The multi-plate clutch transmission as set forth in claim 1, wherein the selective disengaging means comprises a groove around a circumference of the sleeve, a longitudinal central axis of the groove being offset from a longitudinal central axis of the sleeve.

5. The multi-plate clutch transmission as set forth in claim 4, wherein the means for selectively disengaging the clutch comprises:

an actuator arrangement, the actuator arrangement comprising an actuator body that is pivotable about an axis of rotation of the actuator body between a first position and a second position, a shoe slidably mounted in and partially extending from a hole in the actuator body, a shoe portion of the shoe being disposed outside of the hole, the hole being offset from the axis of rotation of the actuator body, and a resilient member for urging the shoe away from the hole, wherein the shoe portion is received in the groove and when the actuator body is in the second position, the shoe portion contacts a surface of the groove and the one or more friction disks on the sleeve are in contact with the one or more friction disks on the clutch basket, and when the actuator body is urged to move to the first position, the shoe portion contacts an opposite surface of the groove and is urged into the hole and bottoms out relative to the actuator and, as the prime mover causes rotation of the sleeve to continue, contact between the groove and the shoe moves the one or more friction disks on the sleeve out of contact with the one or more friction disks on the clutch basket.

6. The multi-plate clutch transmission as set forth in claim 1, wherein the first gear and the second gear are both bevel gears.

7. The multi-plate clutch transmission as set forth in claim 6, wherein the first shaft is substantially perpendicular to the second shaft.

8. The multi-plate clutch transmission as set forth in claim 1, comprising:

a third gear coaxially mounted on and rotatable relative to the second shaft, the third gear engaging with the first gear and being arranged to rotate in a second rotational direction when the first shaft rotates in a first rotational direction;

a second clutch basket fixed to the third gear and coaxially mounted on and rotatable relative to the one of the first shaft and the second shaft on which the one of the first gear or the second gear to which the clutch basket is fixed is coaxially mounted on and rotatable relative to, the second clutch basket comprising one or more friction disks extending radially inward from an interior surface of the second clutch basket, wherein the means for selectively engaging the clutch is adapted to move the sleeve to cause the one or more friction disks on the sleeve to move into contact with the one or more friction disks on the second clutch basket, and the means for selectively disengaging the clutch using prime mover torque is configured to move the one or more friction disks on the sleeve out of contact with the one or more friction disks on the second clutch basket.

9. The multi-plate clutch transmission as set forth in claim 8, wherein the first and second rotational directions are opposite to each other.

10. The multi-plate clutch transmission as set forth in claim 8, wherein the selective disengaging means comprises a groove around a circumference of the sleeve, a longitudinal central axis of the groove being offset from a longitudinal central axis of the sleeve.

11. The multi-plate clutch transmission as set forth in claim 10, wherein the means for selectively disengaging the clutch comprises:

an actuator arrangement, the actuator arrangement comprising an actuator body that is pivotable about an axis of rotation of the actuator body between a first position and a second position, a shoe slidably mounted in and partially extending from a hole in the actuator body, a shoe portion of the shoe being disposed outside of the hole, the hole being offset from the axis of rotation of the actuator body, and a resilient member for urging the shoe away from the hole, wherein the shoe portion is received in the groove and
when the actuator body is in the second position, the shoe portion contacts a surface of the groove and the one or more friction disks on the sleeve are in contact with the one or more friction disks on the second clutch basket, and when the actuator body is urged to move to the first position, the shoe portion contacts an opposite surface of the groove and is urged into the hole and bottoms out relative to the actuator and, as the prime mover causes rotation of the sleeve to continue, contact between the groove and the shoe portion moves the one or more friction disks on the sleeve out of contact with the one or more friction disks on the second clutch basket.

12. The multi-plate clutch transmission as set forth in claim 1, wherein a lead angle of the internal and external threads is selected as a function of pressure capacity of material of friction disks on the sleeve and the clutch basket and one or more of
 a number of friction disks on the sleeve and the clutch basket,
 inner and outer diameters of friction disks on the sleeve and the clutch basket,
 a coefficient of friction between material on friction disks on the sleeve and material on friction disks on the clutch basket,
 prime mover torque to be transmitted,
 a gear ratio between the first gear and the second gear, and
 a relationship between clutch capacity and idle torque.

13. The multi plate clutch transmission as set forth in claim 1, wherein a lead angle of the internal and external threads is between 1 and 90 degrees.

14. The multi-plate clutch transmission as set forth in claim 1, wherein a pressure capacity of material of friction disks on the sleeve and the clutch basket is at least 5 MPa.

15. The multi-plate clutch transmission as set forth in claim 1, wherein there are between 1 and 25 friction surfaces forming the friction disks on the sleeve and the clutch basket.

16. The multi-plate clutch transmission as set forth in claim 1, wherein the coefficient of friction between material on friction disks on the sleeve and material on friction disks on the clutch basket is between 0.05 and 0.2.

17. The multi-plate clutch transmission as set forth in claim 1, wherein a gear ratio between the first gear and the second gear is between 1:1 and 3:1.

18. A marine vehicle comprising the multi-plate transmission set forth in claim 1, the marine vehicle comprising a prime mover connected to the first shaft and a propeller connected to the second shaft.

19. A multi-plate clutch transmission, comprising:
 a first shaft;
 a first gear mounted on and non-rotatable relative to the first shaft;
 a second shaft;
 a second gear coaxially mounted on and rotatable relative to the second shaft, the second gear engaging with the first gear and being arranged to rotate in a first rotational direction when the first shaft rotates in a first shaft rotational direction;
 a clutch basket fixed to one of the first gear or the second gear and coaxially mounted on and rotatable relative to one of the first shaft or the second shaft, respectively, the one of the first or second shaft comprising an externally threaded portion with external threads, the clutch basket comprising one or more friction disks extending radially inward from an interior surface of the clutch basket;
 a sleeve comprising internal threads that mate with the externally threaded portion on the one of the first or second shaft and one or more friction disks extending radially outward from an exterior surface of the sleeve; and
 means for moving the sleeve to selectively cause the one or more friction disks on the sleeve to move into and out of contact with the one or more friction disks on the clutch basket,
 wherein a lead angle of the internal and external threads is selected as a function of pressure capacity of material of friction disks on the sleeve and the clutch basket and one or more of
 a number of friction disks on the sleeve and the clutch basket,
 inner and outer diameters of friction disks on the sleeve and the clutch basket,
 a coefficient of friction between material on friction disks on the sleeve and material on friction disks on the clutch basket,
 prime mover torque to be transmitted,
 a gear ratio between the first gear and the second gear, and
 a relationship between clutch capacity and idle torque.

20. A method of providing a multi-plate clutch transmission, the multi-plate clutch transmission comprising
 a first shaft,
 a first gear mounted on and non-rotatable relative to the first shaft,
 a second shaft,
 a second gear coaxially mounted on and rotatable relative to the second shaft, the second gear engaging with the first gear and being arranged to rotate in a first rotational direction when the first shaft rotates in a first shaft rotational direction,
 a clutch basket fixed to one of the first gear or the second gear and coaxially mounted on and rotatable relative to one of the first shaft or the second shaft, respectively, the one of the first or second shaft comprising an externally threaded portion with external threads, the clutch basket comprising one or more friction disks extending radially inward from an interior surface of the clutch basket,
 a sleeve comprising internal threads that mate with the externally threaded portion on the one of the first or second shaft and one or more friction disks extending radially outward from an exterior surface of the sleeve, and
 means for moving the sleeve to selectively cause the one or more friction disks on the sleeve to move into and out of contact with the one or more friction disks on the clutch basket,
the method comprising:
 selecting a lead angle of the internal and external threads as a function of pressure capacity of material of friction disks on the sleeve and the clutch basket and one or more of
 a number of friction disks on the sleeve and the clutch basket,
 inner and outer diameters of friction disks on the sleeve and the clutch basket,
 a coefficient of friction between material on friction disks on the sleeve and material on friction disks on the clutch basket,
 prime mover torque to be transmitted, a gear ratio between the first gear and the second gear, and
a relationship between clutch capacity and idle torque.

\* \* \* \* \*